April 4, 1950

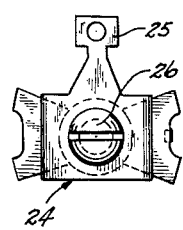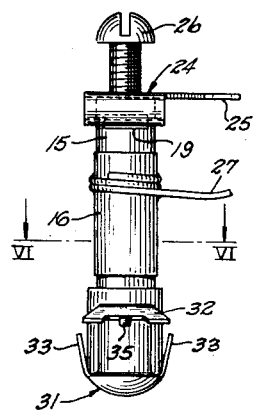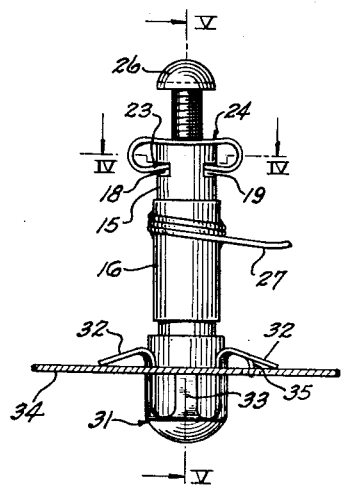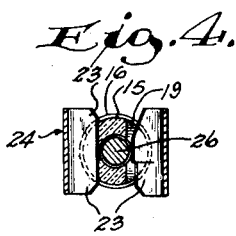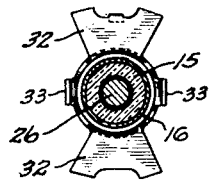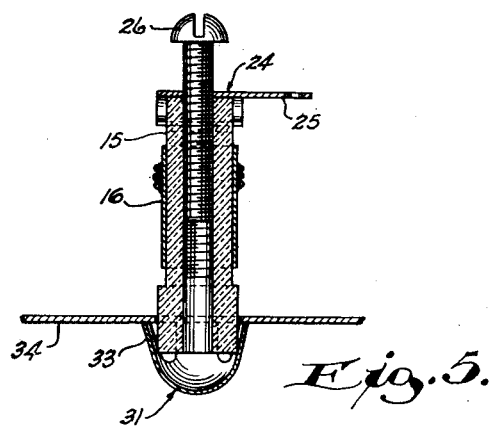
INVENTORS.
HERBERT L. WHITE
WALTER RIETZ
ROBERT L. WOLFF
BY John W. Michael
ATTORNEY.

H. L. WHITE ET AL 2,503,084

ELECTRIC CAPACITOR

Filed Sept. 8, 1947

INVENTORS.
HERBERT L. WHITE
WALTER RIETZ
BY ROBERT L. WOLFF

John W. Michael
ATTORNEY.

Patented Apr. 4, 1950

2,503,084

UNITED STATES PATENT OFFICE 2,503,084

ELECTRIC CAPACITOR

Herbert L. White, Walter Rietz, and Robert L. Wolff, Milwaukee, Wis., assignors to Globe-Union Inc., Milwaukee, Wis., a corporation of Delaware Application September 8, 1947, Serial No. 772,736

1 Claim. (Cl. 151—32)

This invention relates to improvements in an electric capacitor and particularly to a tubular capacitor which may be adjusted and to means for mounting the capacitor in a panel to extend from a surface thereof.

It is one object of the present invention to provide an electrical capacitor which will be stable and which will have approximately linear characteristics.

Another object of the invention is to provide a tubular electrical capacitor of which the capacitance can be adjusted and in which means is provided for retaining the capacitor in its adjusted relation even though subjected to considerable vibration.

A further object of the invention is to provide an electric capacitor in which an adjustable screw forms one plate of the capacitor and is frictionally held in adjusted position.

Another object of the invention is to provide a tubular electrical capacitor which may be resiliently mounted in and extend from a panel in such manner as to be readily removable therefrom but firmly held in its mounted position.

Another object of the invention is to provide a low cost electrical capacitor having an enhanced stability and approximately linear characteristics for resilient mounting in a panel in a firm but readily removable manner and which may be readily adjusted from one side of the panel.

Objects and advantages other than those above set forth will be apparent from the following description when read in connection with the accompanying drawing in which:

Fig. 1 is a top plan view of one embodiment of a capacitor embodying the present invention;

Fig. 2 is a side elevation of the embodiment of Fig. 1;

Fig. 3 is a side elevation similar to Fig. 2 but rotated 90° from the position of Fig. 2 and mounted on a panel;

Fig. 4 is a cross section on the plane of line IV—IV of Fig. 3 and omitting the panel;

Fig. 5 is a cross section on the plane of line V—V of Fig. 3;

Fig. 6 is a cross section taken on the plane of line VI—VI of Fig. 2;

Figure 7:
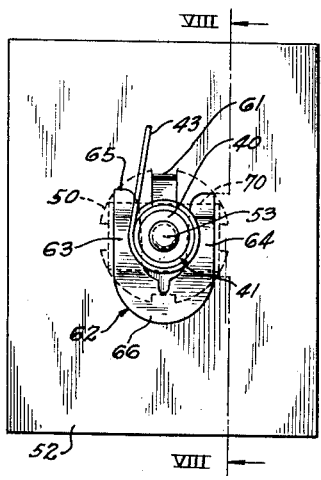
Fig. 7 is a top plan view of a second embodiment of the present invention shown as mounted on a panel.
Figure 8:
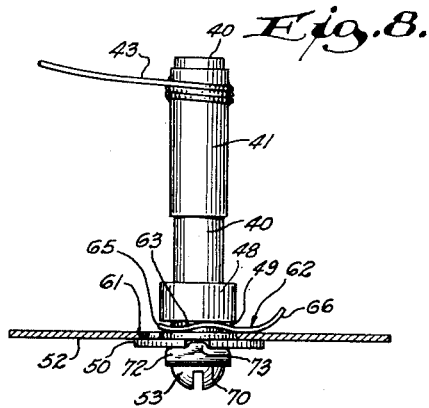
Fig. 8 is a side elevation of the second embodiment but with the panel cut away on the plane of broken line VIII—VIII of Fig. 7.
Figure 9:
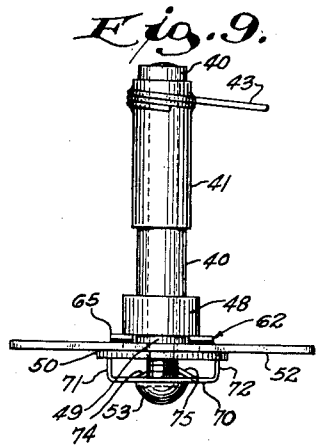
Fig. 9 is a side elevation similar to Fig. 7 but rotated 90° from the position of Fig. 8.
Figure 10:
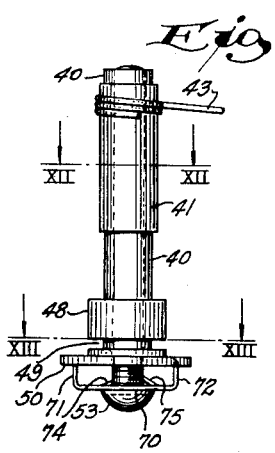
Fig. 10 is an elevation of the capacitor ready for mounting on the panel.
Figure 11:
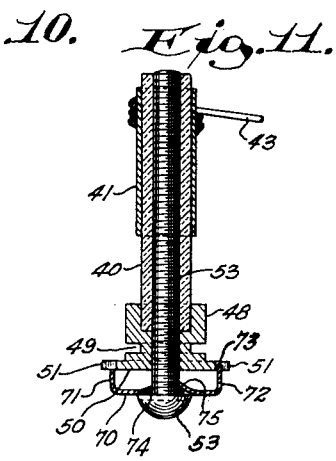
Fig. 11 is a cross section taken on substantially a central vertical plane, parallel to the plane of the paper, of Fig. 10.
Figure 12:
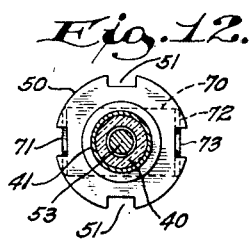
Fig. 12 is a cross section on the plane of line XII—XII of Fig. 10.
Figure 13:
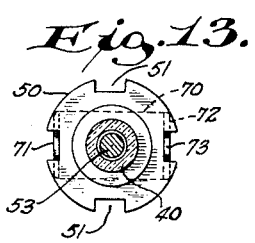
Fig. 13 is a cross section taken on the plane of line XIII—XIII of Fig. 10.

Generally, the present device comprises a tubular capacitor in which one of the conductive plates is formed as a metallic coating bonded on the exterior tube wall surface with a flexible metallic lead fixed to the plate as the terminal. The other and interior conductive plate comprises a screw adjustably engageable with the interior wall of the tube and held in adjusted position by a spring. In each of the two modifications shown of the present invention, the spring is formed with a portion resiliently engaging the screw thread to frictionally hold the screw against accidental rotation relative to the tube, the spring being held against rotation by engagement with the tube, or with a notch in the mounting bushing.

The capacitor is mounted in a panel by means of a socket which is itself resilient or is formed as a rigid bushing held in the panel by resilient means. Where the socket itself is resilient, flanges and fingers are formed on the socket to engage opposite sides of the panel and the panel is resiliently locked between such flanges and fingers. When a bushing is used, a spring acts between the panel and the bushing to hold a flange on the bushing against the panel. The bushing flange is notched for engagement with an ear on the panel and one notch of such flange is engageable by the friction spring retaining the interior plate-screw in position, the notched bushing flange and the various parts co-acting therewith in preventing both rotation of the capacitor relative to the panel, and rotation of the screw relative to the tube. (If the panel is made of material not suitable for the formation of an ear engageable with the flange, a notch may be formed in the panel to engage an ear on the flange.)

Referring particularly to the drawings, a tube 15 of dielectric material and preferably a ceramic of high constant of dielectric coefficient such as the titanium mixtures known, is coated on the exterior wall surface as indicated at 16 with a film of a metal such as silver to form one of the conductive plates of a capacitor. Such coating may be done by several known methods as by painting a solution of a silver compound on the tube surface area to be occupied by the plate 16 and then reducing the solution to metallic silver, by spraying on metal, by chemical deposition, or by any other known process of bonding or interlocking the coating with the surface of the dielectric tube. The tube is grooved as shown at 18 and slotted as at 19 from the exterior of the tube and adjacent one end thereof for receiving the ends 23 of a clip 24 of resilient material which extends over the end of the dielectric tube. The clip has a hole therein concentric with and substantially of the same size as the interior diameter of the tube and is formed with a portion 25 projecting therefrom for connection with a circuit conductor. A screw 26 is threaded into the hole in the clip 24 and extends into the tube into contact with the interior wall surface thereof to form the other conductive plate of the capacitor. The clip end 23 extending through slot 19 engages the screw for resiliently holding the screw in the adjusted position determining the capacitance of the device. The other clip end 23 rests against the flat surface of groove 18 and prevents clip 24 from turning as screw 26 is adjusted. A wire lead 27 is electrically and mechanically attached to plate 16 as by soldering and forms a terminal for such plate.

A socket generally designated 31 is formed of resilient material and of such size as to receive one end of the tube 15. The socket has curved flanges 32 extending therefrom and has fingers 33 formed between the flanges and of such length only as to engage one side of a panel 34 when the capacitor is mounted in an aperture therein as will be described. When the socket 32 is inserted in the aperture of the panel, the fingers 33 are sprung toward the tube in passing through the aperture so that the socket may be pressed through the aperture a sufficient distance to place the flanges 32 under stress and to allow the ends of the fingers 33 to clear the edge of the aperture whereupon the fingers spring outwardly and engage a side of the panel. An ear 35 is struck from one of the flanges 32 for engagement in a hole in the panel whereby the socket is held in fixed position relative to the panel. It will thus be seen that the completed capacitor is resiliently held in the panel and requires only that the socket be sufficiently resilient to retain the capacitor tube therein and that the position of the socket in the panel, is fixed.

In the second embodiment of the invention, tube 40 is again of high dielectric constant ceramic material and is coated on a portion of its exterior wall surface as shown at 41, the coating being a metal such as silver formed in interlocked relation on the tube surfaces and forming the one of the conductive plates of the capacitor. The outer plate 41 has fixed thereon a wire lead 43 forming a terminal for connection of such plate with the other elements of an electric circuit. The tube is set into and fixed in a rigid bushing which includes a cylindrical body portion 48 having an exterior groove 49 formed between the ends of the body portion and having a circular flange 50 at one end of the body portion, the bushing body portion between the groove and the flange being of a height substantially equal to the thickness of a panel 52 and of the same diameter as an aperture in the panel on which the capacitor is to be mounted. The flange is notched on diameters intersecting at right angles and the interior of the bushing is formed with a socket for receiving one end of the tube 40 and with a passage extending through the flange 50 and internally threaded to receive a screw 53 contacting with the interior wall surface of the tube and forming the other and adjustable plate of the capacitor.

The panel 52 in which the capacitor is to be mounted has an aperture in which the bushing body 48 fits and has a lug 61 struck from the edge of the panel aperture to extend at right angles from the panel surface for engagement with one of the notches 51 in the bushing flange 50. When the capacitor is to be mounted in the panel, the tube 40, lead 43 and the bushing body 48 are passed through the panel aperture to seat the bushing flange 50 on a surface of the panel with one flange notch 51 engaging the lug 61. The bushing groove 49 is then immediately adjacent the other surface of the panel and in position to receive a spring clip generally designated 62 which acts against the panel and holds the capacitor therein. Such clip is generally U-shaped with legs 63, 64 which are arched as shown and formed with arcuate tips 65 while the body 66 of the clip extends at an angle to the legs to provide a portion which may be grasped by pliers to insert the clip or remove the clip from the bushing groove. It will be seen that the clip legs then bear on the surface of the panel on arcuate ends of the legs and that the arched central portion of the legs bear on one wall of the groove to hold the bushing flange firmly seated against the panel surface.

The screw or plate 53 is employed to adjust the common or opposite areas of the plates, and hence the capacitance, in circuit and such screw is retained in adjusted position by a spring clip which is generally channel shaped, 70 designating the web of the clip and 71, 72 designates the several flanges thereof. A hole is formed in the clip web to receive the screw 53 and the periphery of such hole is shaped to provide a single turn thread for engagement with the threads of the screw, numerals 74 and 75 indicating the ends of the spring clip thread which is well known. The dimensions of the clip are such that an edge of the clip flanges may rest on the bushing flange 50 over a notch 51 therein and that an ear 73, extending from one of such clip edges, may engage with one notch 51 in the bushing flange 50 to prevent rotation of the clip relative to the bushing. The clip 70—75 is of resilient material and upon engagement with the screw and the bushing flange as above described, urges the screw in one direction to prevent loosening of the screw and misadjustment of the capacitance even though the capacitor and its mounting are subjected to considerable vibration. The tension on the screw may be adjusted by moving ear 73 to another notch 51.

It will thus be seen that the present invention provides a tubular capacitor having a plate formed on the exterior wall surface as a coating integral with the tube. A screw forms the inner plate and serves as means for adjusting the common areas of the plates in circuit. Resilient means are provided for engaging and retaining the screw in an adjusted position. Means are provided for removably mounting the capacitor in an aperture in a panel and comprise either a resilient socket or a rigid bushing forming a socket. The resilient socket has flanges and fingers resiliently engaging the panel adjacent the aperture periphery and engageable with opposite sides of the panel. The rigid bushing or socket is flanged for seating on the panel in locked position due to seating of a panel lug in a notch in the flange and is grooved to receive resilient means for retaining the bushing in seated position. A readily adjustable capacitor with particularly desirable characteristics is thus obtained, the capacitor also being readily removable from but firmly mounted in a panel Although but two embodiments of the present invention have been illustrated and described, it will be apparent to those skilled in the art that various changes and modifications may be made therein without departing from the spirit of the invention or from the scope of the appended claim.

We claim:

A combined mounting and lock for an adjustable screw electrode tubular capacitor comprising a bushing threadedly receiving said screw and mounted on one end of said capacitor, said bushing having a peripheral flange, the inner face of which is adapted to engage a panel and act as one element of a mounting for said capacitor, said flange having a plurality of notches in the periphery thereof, a spring clip threadedly engaging said screw at a portion spaced from said bushing, said spring clip having portions resting on the outer face of said flange to provide a tension on said screw between said bushing and said clip to resiliently resist rotation of said screw, said clip having an ear selectively engaging said notches to prevent rotation of said clip relative to said bushing.

HERBERT L. WHITE.
WALTER RIETZ.
ROBERT L. WOLFF.

REFERENCES CITED

The following references are of record in the file of this patent:

UNITED STATES PATENTS

| Number | Name | Date |
|---|---|---|
| 2,102,098 | Sickles | Dec. 14, 1937 |
| 2,167,270 | Woodward | July 25, 1939 |
| 2,354,748 | Franklin | Aug. 1, 1944 |
| 2,386,732 | Wohlhieter | Oct. 9, 1945 |

FOREIGN PATENTS

| Number | Country | Date |
|---|---|---|
| 523,869 | Great Britain | July 24, 1940 |
| 560,372 | Great Britain | Mar. 31, 1944 |